United States Patent
Buckland et al.

(10) Patent No.: US 6,349,700 B1
(45) Date of Patent: Feb. 26, 2002

(54) ENGINE/VEHICLE SPEED CONTROL FOR DIRECT INJECTION SPARK IGNITION ENGINE APPLICATIONS

(75) Inventors: Julia Helen Buckland, Dearborn; Jessy W. Grizzle, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/637,950

(22) Filed: Aug. 11, 2000

(51) Int. Cl.$^7$ ............................................. F02D 41/00
(52) U.S. Cl. ................................. 123/352; 123/339.19
(58) Field of Search .................. 123/339.2, 339.19, 123/339.21, 352, 353, 354, 355, 356, 357; 701/110

(56) References Cited

U.S. PATENT DOCUMENTS

| | | | |
|---|---|---|---|
| 4,862,851 A | * | 9/1989 | Washino et al. ............ 123/339 |
| 5,590,630 A | * | 1/1997 | Kurihara et al. ........ 123/339.17 |
| 5,642,709 A | | 7/1997 | Ozaki et al. |
| 5,738,070 A | | 4/1998 | Donaldson et al. |
| 5,771,858 A | | 6/1998 | Yoshida et al. |

* cited by examiner

Primary Examiner—Henry C. Yuen
Assistant Examiner—Mahmoud Gimie
(74) Attorney, Agent, or Firm—Jerome R. Drouillard

(57) ABSTRACT

A system and method for engine/speed control of a direct injection spark ignition engine include operating the engine in a stratified charge mode and controlling speed based on engine set points for best performance using fuel as a primary torque actuator and airflow as a secondary torque actuator whenever possible to maintain spark at or near MBT. When current operating conditions and/or system constraints prevent use of engine set points corresponding to best performance, speed control becomes the primary objective. Systems and methods according to the present invention improve the compromise between speed control and best performance set-point objectives.

21 Claims, 7 Drawing Sheets

ENGINE/VEHICLE SPEED CONTROL FOR DIRECT INJECTION SPARK IGNITION ENGINE APPLICATIONS

TECHNICAL FIELD

The present invention relates to systems and methods for engine and/or vehicle speed control for direct injection spark ignition engine applications.

BACKGROUND ART

Engine/vehicle speed control systems and methods attempt to achieve a relatively constant engine/vehicle speed corresponding to a driver or system desired speed, such as a vehicle speed selected for cruise control or an engine speed selected for idle. Conventional engine/vehicle speed controls are limited to a particular engine operating range and employ different strategies (algorithms or "controllers") for idle speed control and cruise control, i.e. standard idle speed control methodology can not be extended to cruise control.

Airflow-based idle speed control strategies use an airflow actuator, such as an idle air bypass valve and/or electronically controlled throttle valve, as the primary actuator to control engine speed to a desired idle speed selected according to current operating conditions. Torque-based idle speed control strategies typically use ignition timing (spark) as the primary fast torque actuator to control engine speed by modifying engine brake torque. Spark is typically preferred for speed control because the engine output torque and resulting engine speed respond very quickly to changes in spark timing. Furthermore, spark has a broad range of authority over output torque, i.e. spark can be used to rapidly vary output torque to nearly zero, if desired. However, any departure of spark timing from the spark timing that gives maximum torque for a given amount of air and fuel (MBT) may result in a fuel economy penalty.

Speed control strategies for gasoline engines, whether using spark, air, or fuel, require consideration of the effect on emissions and associated emission control devices. For conventional engines, where three-way catalysts are used, the air/fuel ratio must be tightly controlled near the stoichiometric ratio to prevent premature reduction of the catalyst conversion efficiency. Likewise, proper emissions control is more easily achieved by maintaining appropriate catalyst operating temperatures.

In a lean burn direct injected spark ignited (DISI) engine (which includes direct injection stratified charge or DISC engines), the air/fuel ratio is not constrained to a narrow range about the stoichiometric value. These engines can operate in a stratified or homogeneous mode with improved fuel economy due primarily to reduced pumping losses during stratified mode operation, particularly at low engine speeds and loads such as experienced at idle. While operation in the homogeneous mode may employ similar control strategies as a conventional port fuel-injected engine, stratified mode operation is more complex and provides new opportunities for improving speed control at idle and during cruise control.

SUMMARY OF THE INVENTION

An object of the present invention is to provide systems and methods for engine/vehicle speed control during stratified mode operation of DISI engines, particularly lean burn DISC engines.

In carrying out the above object and other objects, advantages, and features of the present invention, one embodiment includes a system and method for controlling engine/vehicle speed in a direct injection spark ignition internal combustion engine application. The system/method determine a speed error based on a difference between an actual speed and a scheduled speed, determine a desired engine torque based on the speed error, determine required fuel to deliver the desired engine torque, calculate an air/fuel ratio based on the required fuel and current airflow, and control at least one fuel injector to deliver the required fuel if the air/fuel ratio is within an acceptable air/fuel ratio range for current engine operating conditions.

Methods and systems for engine/vehicle speed control according to the present invention may be used in DISI engines having variable valve timing or variable cam timing, in addition to any throttled or unthrottled DISI engines, including lean burn DISI engines.

The present invention provides a number of advantages over prior art control strategies. For example, the present invention uses fuel as the primary fast torque actuator rather than spark because engine operation is not limited to a narrow range of stoichiometry. Spark can then be maintained substantially at MBT to enhance fuel economy. The present invention provides engine/vehicle speed regulation while maintaining engine set-points to reduce performance penalties due to compromises in control to achieve both objectives. When air/fuel ratio limits prohibit the control of torque using fuel, the present invention performs speed regulation only and uses airflow control as the torque actuator for this task. Airflow control can be provided by an electronically controlled throttle, or using variable valve timing or variable cam timing. The present invention uses a two-degree of freedom controller design to respond differently to errors arising from load torques suddenly applied to the engine than to speed set-point command changes. The present invention provides systems and methods for speed control which function properly over the entire operating region of the engine such that they can be used for both idle speed control and cruise control.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
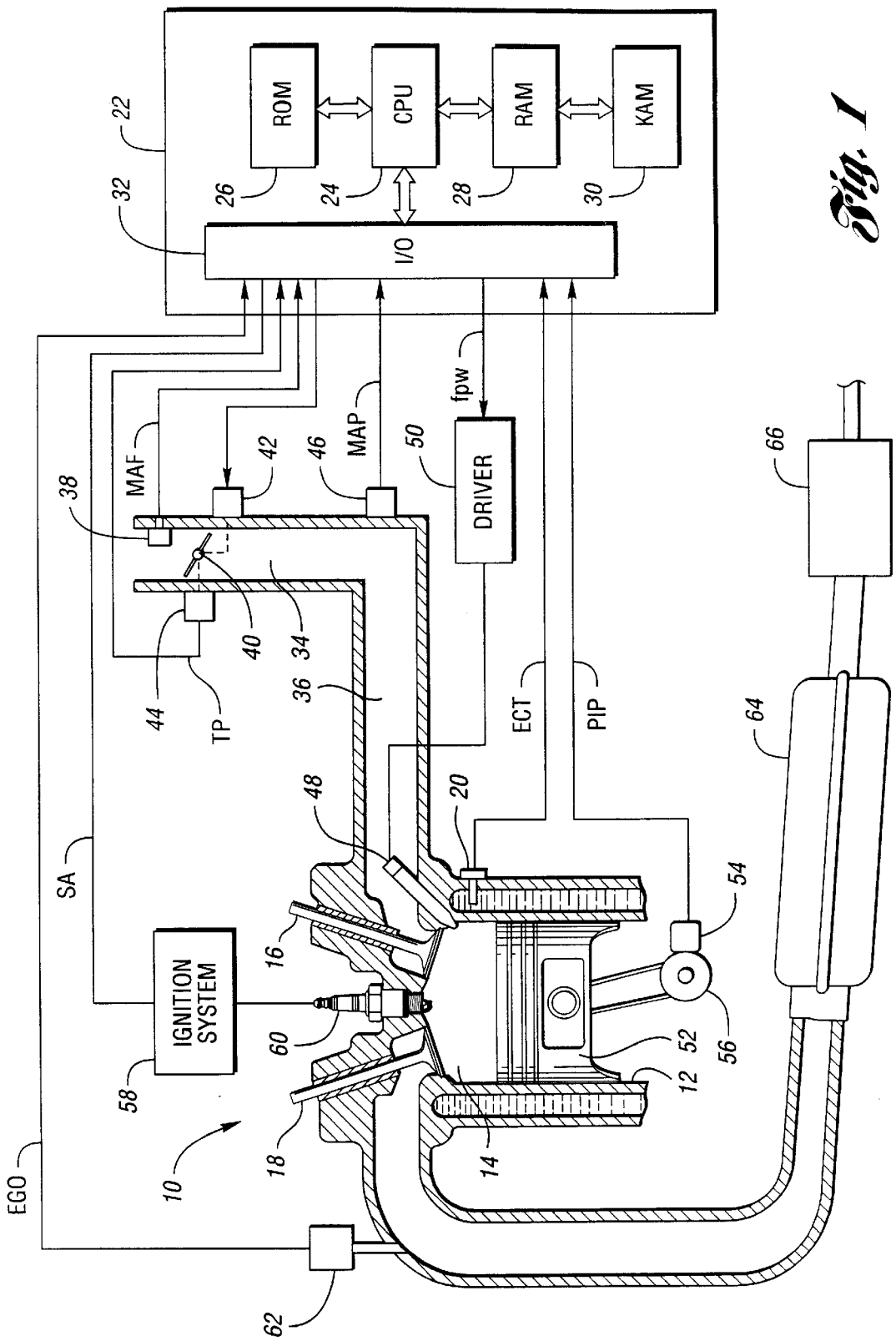
FIG. 1 is a block diagram illustrating an engine control system for a DISI engine according to the present invention.

A block diagram illustrating an engine control system for a DISI engine according to the present invention is shown in FIG. 1. System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators which operate the intake valves 16 and exhaust valves 18, while only including a single engine coolant temperature sensor 20.

In one embodiment, the present invention includes a mechanical variable cam timing device of conventional design used to alter the timing of intake valves 16 and/or exhaust valves 18 to provide airflow control. In an alternative embodiment, intake valves 16 and/or exhaust valves 18 are controlled by variable valve timing actuators, such as electromagnetic actuators, to provide airflow control.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMS, EEPROMS, flash memory, or any other electric, magnetic, optical, or combination memory device capable of storing data, some of which represents executable instructions, used by microprocessor 24 in controlling the engine. Microprocessor 24 communicates with the various sensors and actuators via an input/output (I/O) interface 32. As one of ordinary skill in the art will understand, controller 22 is a hardware device which implements one or more "controllers" (as illustrated in FIGS. 7–10 for example) using software to control various engine/vehicle operating parameters, such as engine speed or vehicle speed. Of course, the present invention could utilize more than one physical controller, such as controller 22, to provide engine/vehicle control depending upon the particular application.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. In some embodiments of the present invention, a throttle valve 40 is used to modulate the airflow through intake 34 during certain operating modes. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

As will be appreciated by those of ordinary skill in the art, the present invention may also be used in unthrottled or throttleless DISI engines where airflow may be controlled using appropriate valve timing. Whether or not the engine includes a physical throttle, such as throttle valve 40, the engine may be operated in various unthrottled modes. Such operation reduces pumping losses and increases engine efficiency which may result in improved fuel economy. Throttleless engines may include those having variable valve timing (VVT) where intake and exhaust valves are controlled electronically using electromagnetic actuators rather than a conventional cam arrangement. Likewise, engines having variable cam timing mechanisms may be operated at wide open throttle to reduce pumping losses with airflow control provided by modifying the cam timing. The present invention is also applicable to DISI engine configurations with conventional valve timing mechanisms which may also operate at wide open throttle in various modes, such as when operating in a lean burn or stratified mode.

As illustrated in FIG. 1, a manifold absolute pressure sensor 46 is used to provide a signal (MAP) indicative of the manifold pressure to controller 22. Air passing through intake manifold 36 enters combustion chamber 14 through appropriate control of one or more intake valves 16. As described above, intake valves 16 and exhaust valves 18 may be controlled directly or indirectly by controller 22 for variable valve timing or variable cam timing applications, respectively. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 processed by driver 50.

As illustrated in FIG. 1, fuel injector 48 injects an appropriate quantity of fuel in one or more injections directly into combustion chamber 14. Control of the fuel injection events is generally based on the position of piston 52 within cylinder 12. Position information is acquired by an appropriate sensor 54 which provides a position signal (PIP) indicative of rotational position of crankshaft 56.

According to the present invention, speed control is provided using fuel as the primary fast torque actuator when current operating conditions permit. The desired fuel flow is modified to provide speed control during operation in stratified charge mode using appropriate signals generated by controller 22 for fuel injectors 48 to inject an appropriate quantity of fuel in one or more injections directly into each combustion chamber 14.

Airflow is preferably used as a secondary torque actuator. In throttleless applications, airflow is controlled using signals generated by controller 22 to control the intake valves 16 for variable valve timing or variable cam timing, as described in greater detail with reference to FIGS. 2 through 9. In throttled applications, airflow may be controlled using the throttle valve in combination with control of valve timing for intake and/or exhaust valves.

At the appropriate time during the combustion cycle, controller 22 generates a spark signal (SA) which is processed by ignition system 58 to control spark plug 60 and initiate combustion within chamber 14. Preferably, spark is maintained substantially at MBT, i.e. the timing that produces maximum torque for a given amount of air and fuel, whenever possible because these conditions generally result in better fuel economy. According to the present invention, spark or ignition timing is not substantially modified to provide speed control.

Controller 22 (or a conventional camshaft arrangement) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the air/fuel ratio, or control the operating mode of one or more cylinders. The exhaust gas is passed through the exhaust manifold and through a first catalyst 64 and second catalyst 66 before being exhausted to atmosphere.

As known, direct injection spark ignition engines such as illustrated in FIG. 1 may generally be operated in at least two modes of operation. To maintain stable combustion, the air/fuel ratio should be controlled within a first range for the stratified mode of operation and a second range for the homogeneous mode of operation. The specific air/fuel ranges may vary depending upon the particular application. As one example, stable combustion in the stratified mode may require air/fuel ratios between about 25:1 and about 40:1 while stable combustion in the homogeneous mode may require air/fuel ratios between about 12:1 and 20:1. Depending upon the particular engine configuration, various other operating modes with corresponding air/fuel ratios may also be used. The illustrated embodiments of the present invention are based on an engine model for which the air/fuel ratio gap between homogeneous lean and stratified modes has been filled by interpolation.

Diagrams illustrating operation of systems and methods for speed control of a DISI engine are provided in the figures. The diagrams generally represent control logic of one embodiment of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic and controllers illustrated in the figures are implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

Figure 2:
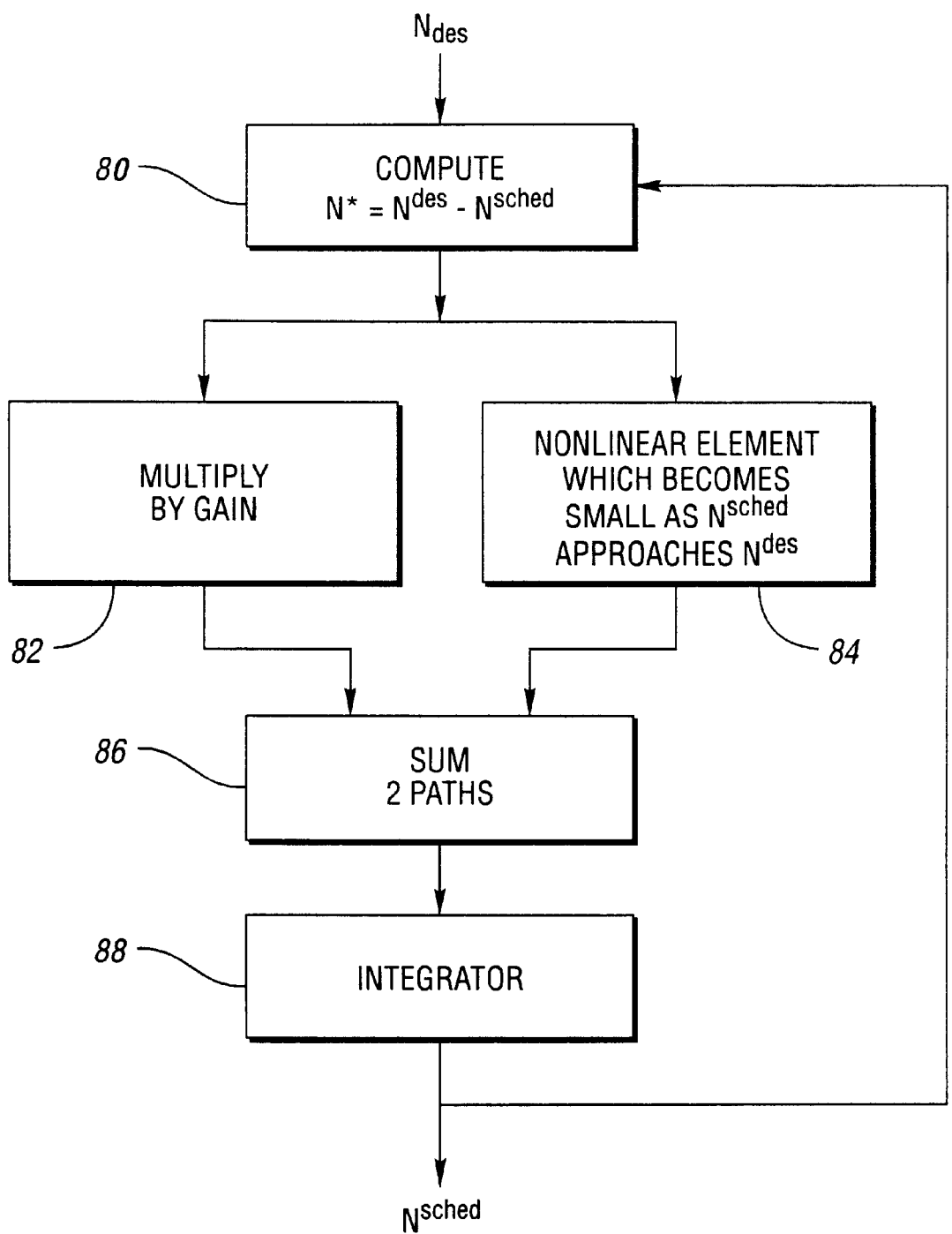
FIG. 2 is a diagram illustrating operation of a speed command shape filter in a system and/or method for engine/vehicle speed control in a DISI engine according to the present invention.

Referring now to FIG. 2, a block diagram illustrating a speed command shape filter for use in a system or method for controlling speed in a direct injection spark ignition internal combustion engine application is shown. Blocks 80–88 determine a scheduled speed based on a desired speed according to one embodiment of the present invention. As described above, the speed may be engine speed as used in idle control, for example, or vehicle speed as used in cruise control, for example. Depending upon the particular application, the desired speed may be determined based on driver inputs and/or current engine operating conditions and/or current vehicle operating conditions. For example, in cruise control applications, the desired speed $N_{des}$ may be the cruise control set speed. For idle speed control, the desired speed may be determined based on engine coolant temperature, for example.

Block 80 computes an intermediate operating variable N* based on the desired speed $N^{des}$ and the previously determined scheduled speed $N^{sched}$. As represented by block 80, N* represents the difference between the desired speed and the previously determined scheduled speed. This difference is multiplied by a gain as represented by block 82. The path including block 82 is essentially a low pass filter.

The difference is also provided to a second path containing block 84, which applies a non-linear element to the difference. In this embodiment, block 84 represents a non-linear element which becomes small as the scheduled speed approaches the desired speed. An example of such a non-linear element is represented by:

$$X = \frac{K*(N^{des} - N^{sched})^3}{N^3}.$$

Block 86 of FIG. 2 combines the results of the two paths represented by blocks 82 and 84 preferably using a summing operation. The result is then integrated by block 88 to provide the scheduled speed $N^{sched}$ which is subsequently used by the controller as described below.

As will be recognized by those of ordinary skill in the art, the speed command shape filter illustrated in FIG. 2 only has an effect when the desired speed changes. Stated differently, during steady state operation, the scheduled speed output by the speed command shape filter approaches the desired speed input to the shape filter.

Figure 3:
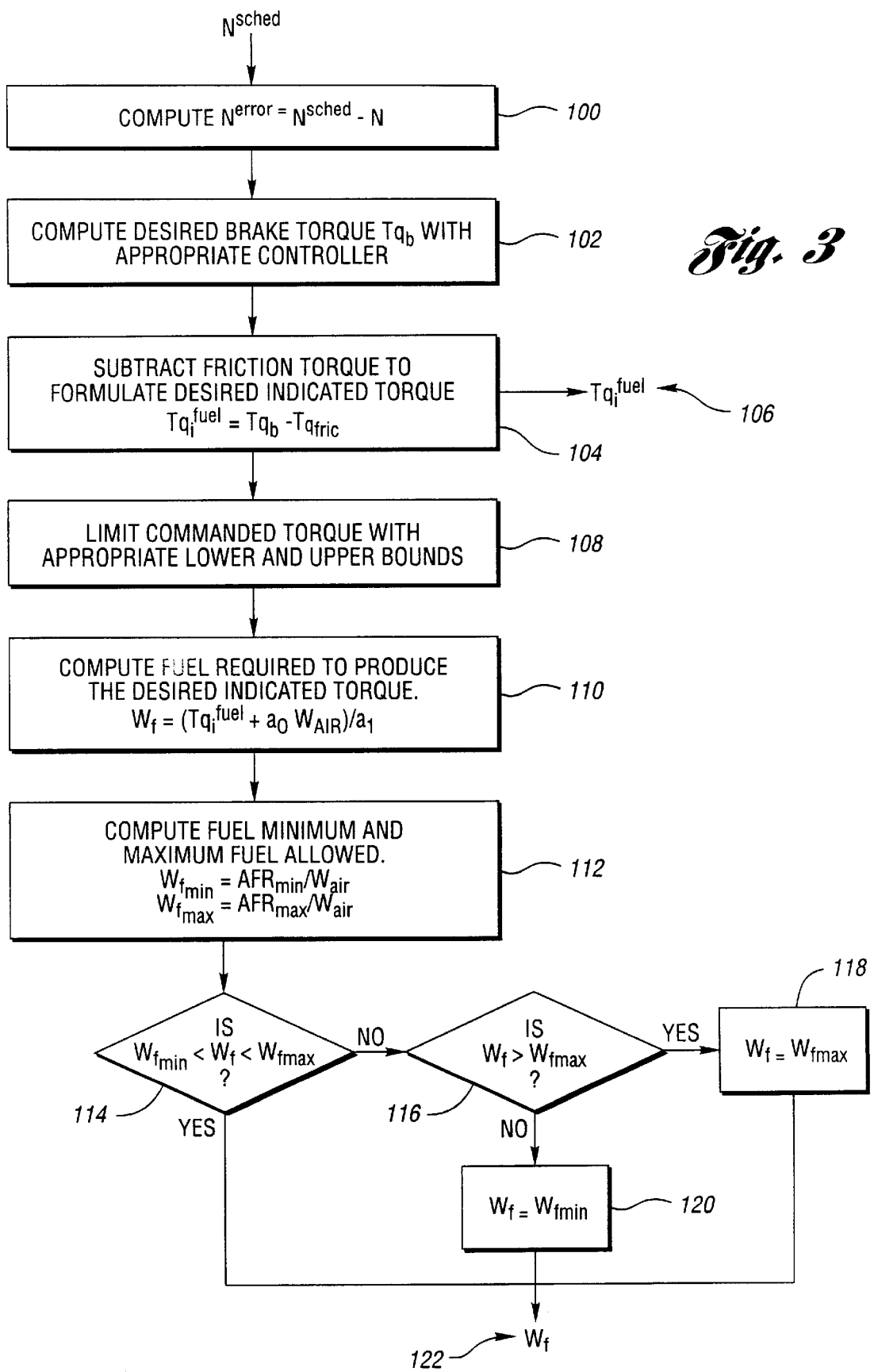
FIG. 3 is a diagram illustrating operation of a fuel control system and/or method for use in an engine/vehicle speed control in a DISI engine according to the present invention.

FIG. 3 is a diagram illustrating operation of a fuel control system and/or method for use in an engine/vehicle speed control for a DISI engine application according to the present invention. Block 100 represents determination of a speed error based on a difference between an actual speed N and a scheduled speed $N^{sched}$. The desired torque is then determined using an appropriate controller, such as a proportional-integral-derivative (PID) controller as represented by block 102. In this embodiment, block 102 determines the desired brake torque with associated friction torque subtracted, as represented by block 104, to form a desired indicated torque. The desired indicated torque is then provided in the throttle control as represented by block 106.

The desired torque may be limited to appropriate upper and lower bounds as represented by block 108. The fuel required to produce the desired indicated torque is then determined as represented by block 110. The minimum and maximum quantities of fuel allowed for the current engine operating mode or conditions are determined based on corresponding air/fuel ratios as represented by block 112. Block 114 then determines whether the fuel required to achieve the desired engine torque is within the upper and lower bounds computed by block 112. If the required fuel exceeds the currently available maximum as determined by block 116, the fuel is limited to the maximum available by block 118. Similarly, if the required fuel is below the allowable minimum, the required fuel is limited to the minimum amount as represented by block 120. The calculated fuel is then provided to the injector control to deliver the appropriate quantity fuel to one or more fuel injectors and to the airflow control to adjust the intake error as required.

Figure 4:
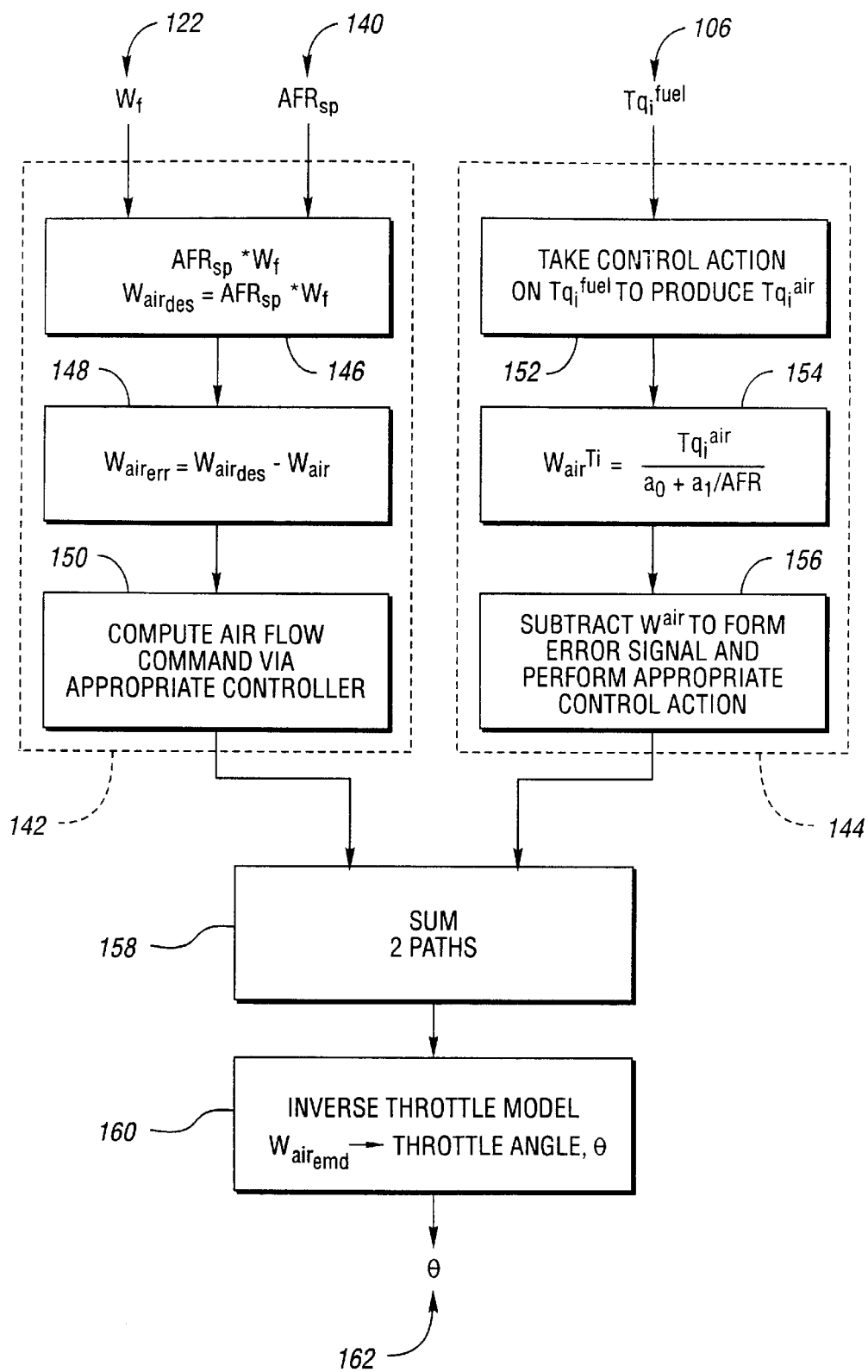
FIG. 4 is a diagram illustrating operation of an airflow control system and/or method for use in an engine/vehicle speed control in a DISI engine according to the present invention.

FIG. 4 illustrates operation of an airflow control system and/or method for use in an engine/vehicle speed control for a DISI engine application according to the present invention. In the embodiment illustrated in FIG. 4, the airflow control is provided by an electronically controlled throttle. This embodiment includes two paths indicated generally by reference numerals 142 and 144. Path 142 controls the throttle position to achieve a desired set point based on current engine operating conditions with the torque control provided by fuel alone. Path 144 controls the throttle position to provide torque control and deliver the desired torque when the fuel command is limited due to the air/fuel ratio constraints.

Inputs provided to path 142 include the required fuel 122 determined as described and illustrated with reference to FIG. 3 in addition to a specific air/fuel ratio setpoint 140 provided by the engine controller. The desired airflow is calculated based on the air/fuel ratio and the computed fuel as represented by block 146. An airflow error is then determined based on the current airflow and desired airflow as represented by block 148. An airflow command is then computed using an appropriate controller as represented by block 150. For example, a proportional-integral (PI) controller may be used to provide an appropriate airflow command based on the error in airflow.

Path 144 generates a required indicated torque command for the airflow actuator based on the required indicated torque command for the fuel actuator at block 152. As one example, block 152 may apply a lead filter to the fuel-based torque command to produce the air-based torque command to account for manifold filling affects and transport delay between a throttle actuator and air inducted into particular cylinders. Block 154 determines the necessary airflow based on the corresponding torque and air/fuel ratio (AFR). The airflow computed by block 154 is subtracted from the airflow corresponding to the current position of the airflow actuator to form an error signal and perform appropriate control action. For example, an appropriate controller may be a proportional controller. The logic of block 156 makes path 144 zero when the required fuel is not saturated, i.e. is between the lower and upper bounds as determined by block 112 of FIG. 3.

The resulting calculations of paths 142 and 144 are combined at block 158. An approximate inverse throttle model is used to convert the airflow command to an airflow actuator position command, i.e. a desired throttle angle in this embodiment, as represented by block 160. The throttle angle command 162 is then used to control the electronically controlled throttle.

Because the intake air generally enters the intake manifold through a primary throttle and, while lean, also through an exhaust gas recirculation (EGR) system, the throttle angle command may be adjusted to accommodate EGR flow. For example, on the basis of the required change in airflow, the present invention may determine what portion of the air charge is to be commanded from the primary throttle and what portion is to be obtained from EGR (assuming that the exhaust gas is lean of stoichiometry). One way to accomplish this is to adjust the EGR valve to achieve a given burned gas fraction in the intake manifold based on current emissions requirements, for example. The mass flow rate of air coming from EGR is then computed and subtracted from the required change in airflow. The throttle position command is then adjusted to deliver the difference and may be modified by an appropriate gain factor to account for the intake manifold dynamics.

Figure 5:
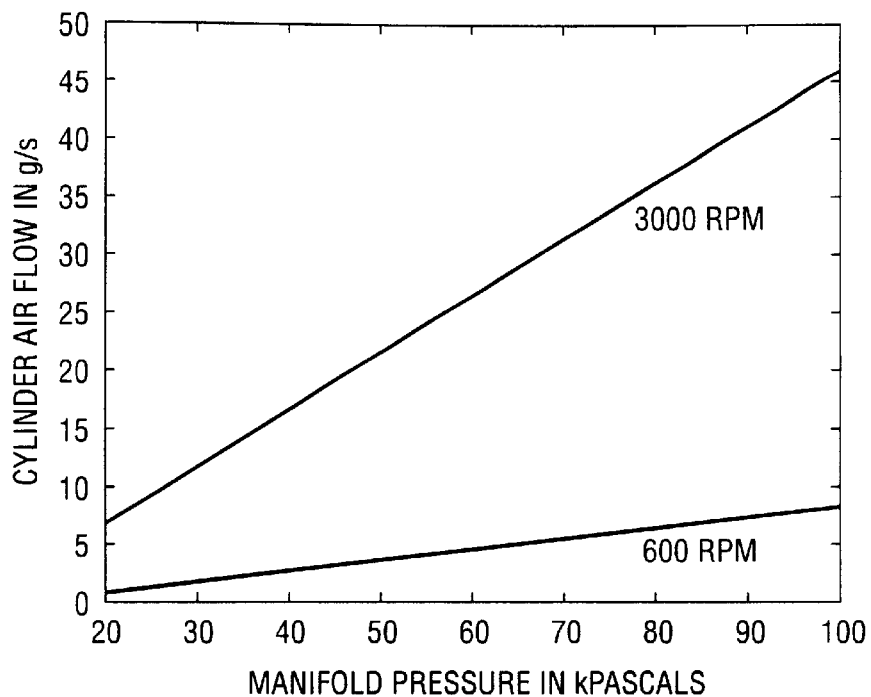
FIG. 5 is a diagram illustrating cylinder airflow as a function of manifold pressure for an engine model used to analyze the present invention.

A detailed analysis of the present invention has been completed using a 1.8 L DISI engine model where the homogeneous and stratified modes have been interpolated to remove the gap in air/fuel ratios. The intake manifold and air charge model is represented by:

$$\dot{P}_i = \frac{RT_{im}}{V}(W_{th} + W_{egr} - W_{cyl})$$

where $RT_{im}/V$ equals 10.698, $W_{th}$ and $W_{egr}$ represent the mass flow rates through the throttle body and EGR valve, respectively, and $W_{cyl}$ is the mean value of the flow rate into the cylinders over an intake event given by:

$$W_{cyl} = \alpha(N) + \beta(N)P_i,$$

where N represents the engine speed and $P_i$ is the intake manifold pressure. The functions used in this study are shown in FIG. 5.

The burned gas fraction of the intake manifold is denoted by $F_i$, and is defined as the mass of burned exhaust gas in the intake manifold, $m_{bg}$, divided by the total mass in the intake manifold, $m_i$. If $F_e$ represents the burned gas fraction of the exhaust gas entering the intake manifold, then:

$$\dot{m}_{bg} = F_e W_{egr} = F_i W_{cyl}$$

$$F_i = \frac{m_{bg}}{m_i}; \quad \text{wherein:} \quad m_i = \frac{P_i V}{RT_{im}}$$

The air mass flow rate through the throttle body may be represented by a standard orifice flow equation, such as:

$$W_{th} = \frac{A_{th} P_{amb}}{\sqrt{T_{amb}}} \varphi\left(\frac{P_i}{P_{amb}}\right)$$

where $A_{th}$ is the effective throttle flow area. The exhaust gas mass flow rate through the EGR valve may also be represented by a standard orifice flow equation:

$$W_{egr} = \frac{A_{egr} P_e}{\sqrt{T_{egr}}} \varphi\left(\frac{P_i}{P_e}\right),$$

where $A_{egr}$ represents the effective EGR flow area.

The air/fuel model for this embodiment will now be described in detail. Let $r_c$ be the air/fuel ratio in a cylinder, defined as the ratio of total air available in the cylinder for combustion to injected fuel; where total air includes air metered through the throttle body and air recirculated through the exhaust. The cylinder air/fuel ratio may then be calculated according to:

$$r_c = \frac{(1 - F_i)W_{cyl}}{W_f},$$

where $W_f$ is the average fuel flow rate into the cylinder over an engine event. The quantity $(1-F_i)W_{cyl}$ represents the amount of air that enters the cylinders, while $F_i W_{cyl}$ represents the amount of inert exhaust gas that enters the cylinders. Because the quantity $r_c$ ignores the recirculated exhaust gas, it does not correspond to the air/fuel ratio that would be measured in the exhaust by a corresponding sensor. This value is given by:

$$r_e = \frac{F_i W_{cyl} \frac{S}{S+1} + (1 - F_i)W_{cyl}}{F_i W_{cyl} \frac{1}{S+1} + W_f},$$

where S represents the stoichiometric air/fuel ratio. This is valid if the exhaust gas being recirculated is not rich, which is usually the case. The burned gas fraction of the exhaust gas can be computed to be:

$$F_e = \frac{S+1}{r_e + 1},$$

which is also valid only if the recirculated exhaust gas is not rich.

The engine brake torque $T_b$ is the net torque available on the crankshaft and may be modeled as a sum of three terms:

$$T_b = T_i + T_{mf} + T_p$$

where $T_i$ is the indicated torque (the total torque delivered to the piston by the combustion process), $T_{mf}$ is the mechanical rubbing friction torque needed to overcome the resistance due to the moving parts of the engine, and $T_p$ is the torque needed to do the pumping work during intake and exhaust strokes. The two loss terms $T_{mf}$ and $T_p$ can be represented in a common form and thus it is convenient to define:

$$T_f = T_{mf} + T_p$$

which can be represented as:

$$T_f = b_0(N) + b_1(N) P_i$$

Figure 6:
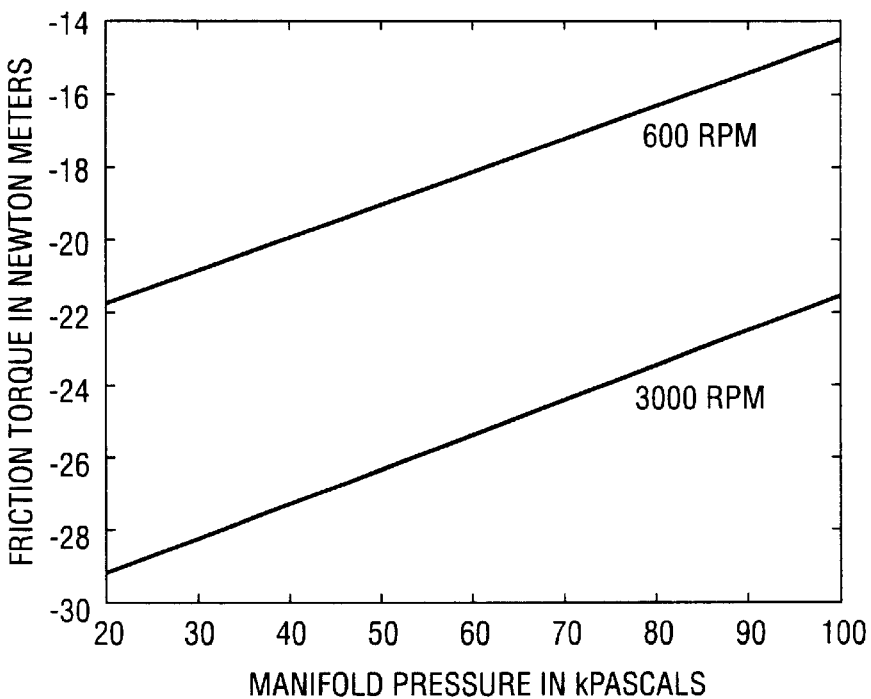
FIG. 6 is a diagram illustrating friction torque as a function of manifold pressure for an engine model used to analyze the present invention.

The friction torque model used in this embodiment is shown in FIG. 6.

Indicated torque was only modeled at MBT spark. For this reason it could be given in a very simple form:

$$T_i = a_0(N) W_{cyl} + a_1(N) W_f$$

The coefficients $a_0$ and $a_1$ can be determined via conventional engine mapping techniques. For this embodiment, $a_0 = 0.27$ and $a_1$ ranges from 46 at 3000 RPM to 260 at 600 RPM.

As is well known to those skilled in the art of engine models, the production of indicated torque depends on the proper sequencing of charge formation and ignition. None of this "timing" information is represented in the above model. As such, this information has to be added to respect the proper sequencing of a four-cycle engine as can be found in numerous texts on engine models.

The sensor used to measure the exhaust air/fuel ratio, $r_e$, will have associated dynamics as well. It is assumed that the sensor is linear with a time constant of 300 ms. Specifically, the sensor dynamics may be represented by the transfer function:

$$\frac{1}{0.3\,s+1}.$$

The overall model can be summarized in a compact form. With the time delays (d=60/N) set for stratified operation and spark set to MBT, the engine speed model can be expressed as:

$$\dot{P}_i(t) = \frac{RT_{im}}{V}(W_{th}(t) + W_{egr}(t) - W_{cyl}(t))$$

$$T_i(t) = a_0(N(t))(1 - F_i) W_{cyl}(t-d) + a_1(N(t)) W_f(t)$$

$$\dot{N}(t) = \frac{1}{J_e}(T_i(t-d) + T_f(t) - T_{load}(t))$$

where $J_e$, the engine inertia, is 1/25 (Nm sec$^2$/rad), for example.

If brake torque can be directly controlled, then the speed control problem amounts to designing a controller for the system represented by:

$$\dot{N}(t) = \frac{1}{J_e}(T_b(t-d) + (T_f(t) - T_f(t-d)) - T_{load}(t)).$$

$$T_f^{del} := (T_f(t) - T_f(t-d))$$

The quantity $T_f^{del}$ will be small as long as the closed-loop system's bandwidth is less than 2/d, which gives a bound of approximately 20 rad/sec. Neglecting the term $T_f^{del}$, as well as saturation, and assuming that the load torque is unknown, but constant, results in a simple linear problem. To achieve zero steady state error for constant engine speed commands, a PID-controller is appropriate. Using Bode design techniques results in the controller:

$$T_b(t) = \left(K_p + \frac{K_I}{s} + \frac{K_D s}{.02\,s+1}\right)(N_{des} - N)(t)$$

with $K_p = 0.28$, $K_I = 0.17$ and $K_D = 0.0094$. The mixed notation f(s) ($N_{des}$−N) (t) is used to simplify the expressions. This controller can be written as $$T_b(t) = C_0(s)(N_{des} - N)(t) = \frac{50(s + 0.62)(s + 18.27)}{s(s+50)}(N_{des} - N)(t).$$

For the purposes of computing the Bode plot, the time delay was approximated by a first order Padé approximation. The controller is valid for any speed-torque point of the engine's operation. The closed-loop bandwidth is dictated by the time-delay d.

Because brake torque is not directly controllable in most applications, the control signal is first related to indicated torque via:

$$T_i^{fuel}(t) = C_0(s)(N_{des} - N)(t) - T_f(t)$$

and then to commanded fuel flow by:

$$W_f(t) = (T_i^{fuel}(t) - T_j(t) - a_0(N(t))(1 - F_i(t)) W_{cyl}(t)) / a_1(N(t)).$$

The controller can be applied as long as the air/fuel stays within allowable bounds, such as between stoichiometry and 40:1, for example. For the moment, this is assumed to the case, and attention is now turned to how to control the airflow, which is modulated by the throttle in this example. The case where the fuel controller results in an air/fuel ratio that is outside of the allowed bounds will be addressed below.

Speed control must ultimately be integrated into the overall engine control structure. In particular, speed control must be integrated with the controller which determines the optimal spark, exhaust gas recirculation and air/fuel ratio settings for best fuel economy and emissions for given speed and load torque conditions. Since fuel is being used to regulate engine speed, airflow must be used as the actuator for the air/fuel ratio. A single input, single output (SISO) PI controller may be used to regulate the air/fuel ratio at a commanded value. The design of this controller is greatly simplified if the throttle is first feedback linearized. This amounts to designing a pre-compensator for the throttle which mathematically inverts the nonlinearities in the model described above.

As such, the controller is now free to command directly a given mass airflow rate, instead of doing so indirectly through throttle angle. Modeling errors should be well within the gain margins of the controllers described here. To simplify calibration, it is desirable that the throttle to air/fuel ratio controller be as independent as possible of the fuel-to-speed controller (whenever the speed disturbances can be handled by fuel flow rate adjustments alone). For these two controllers to be independent, the bandwidth of their respective closed-loop systems are preferably kept a decade or so apart. Depending upon the particular applications, the relatively long delay in the measurement of $r_e$ may impose additional constraints. For example, the bandwidth of the throttle to air/fuel feedback loop may be limited to less than one radian per second.

There are several possible ways to design the throttle to air/fuel controller. The following four (4) methods provide representative designs.

Method 1

A mass airflow estimate can be formed on the basis of measured air/fuel ratio by:

$$W_e^{air}(t) = r_e(t) W_f(t-d_6),$$

where $d_6$ is approximately six engine events or three revolutions of the engine. With this in mind, form the error in desired air/fuel ratio, $r_e^{des} - r_e$ and convert this into an error in desired mass airflow rate by multiplying by $W_f(t-d_6)$. One is then essentially faced with designing a set-point controller for the system $$\dot{P}_i = \frac{RT_{im}}{V}(W_{th} + W_{egr} - W_{cyl})$$

$$y = W_{cyl}(t - d_6)$$

Classical design rules lead to the PI controller:

$$W_{th}(t) = K_P^1 W_f(t - d_6)(r_e^{des} - r_e)(t) + \frac{K_I^1}{s} W_f(t - d_6)(r_e^{des} - r_e)(t),$$

with $K_p^1 = 2/3$ and $K_I^1 = 1$. If desired, a low-pass filter could be applied to the fuel signal before multiplying by $r_e$ to form the mass airflow estimate.

Method 2

A feed-forward term from fuel to throttle could be added. The objective would be to keep the air/fuel ratio roughly constant, even if fuel is varying.

Method 3

The throttle controller may be designed to operate on the basis of the air/fuel measurement, without post-multiplying by fuel.

Method 4

Perform an essentially open-loop control based on computed (or estimated) air/fuel ratio. This avoids reliance on a measured air/fuel ratio which may be inaccurate particularly at high air/fuel ratios as seen during operation in stratified mode.

In response to a sufficiently large added load torque, the controller described above will command a value of fuel that will result in an air/fuel ratio that exceeds a desired lower bound, stoichiometry, for example. Also, in response to the removal of a sufficiently large load, the controller will command a value of fuel resulting in an air/fuel ratio that is higher than an allowable bound, the lean limit, for example. In either case, the fuel flow rate, as an actuator, is effectively saturated. If speed control is of higher priority than set-point optimality, as is the case for idle speed or cruise control, then the throttle must be re-assigned for speed control.

Let $[R_1, R_2]$ be the allowed range of air/fuel ratios. Assume that $W_f$ has been saturated to meet the air/fuel ratio bounds, so that:

$$W_f = \frac{(1 - F_i)W_{cyl}}{R_j}, \text{ where } j \in \{1, 2\}.$$

Then torque is determined by airflow. On this basis, the indicated torque can be determined by:

$$T_i = (a_0(N) + a_1(N)/R_j)(1 - F_i)W_{cyl}.$$

and solved for $W_{cyl}$ to obtain the desired mass flow rate of air out of the intake manifold as a function of desired indicated torque.

Figure 7:
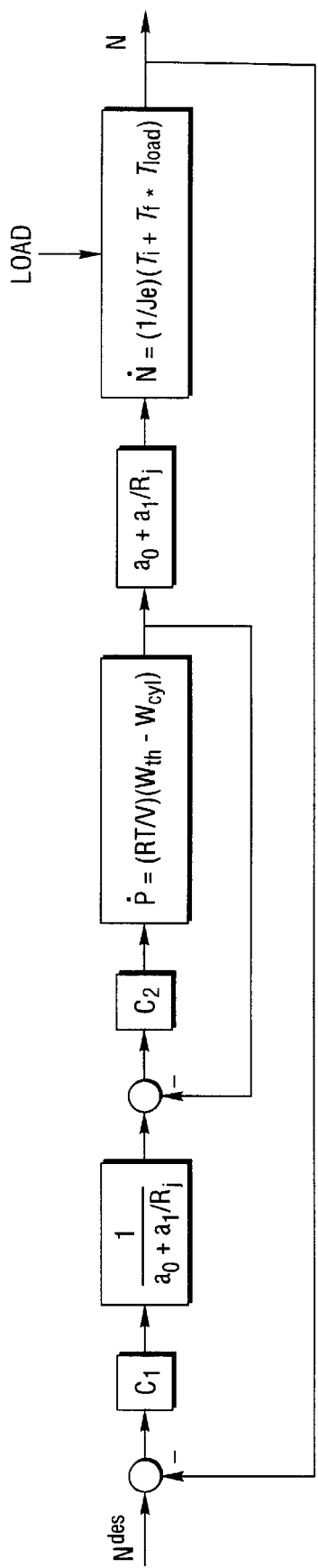
FIG. 7 is a diagram illustrating a speed controller architecture with throttle as the primary actuator when fuel is saturated in a system and/or method for speed control in a DISI engine according to the present invention.

FIG. 7 depicts a controller architecture for regulating speed via the throttle when fuel is saturated based on air/fuel ratio constraints. The structure of the controller is well-grounded in control design fundamentals: the non-linear control design method of back-stepping can be shown to lead to a controller of the form indicated in FIG. 7, and this structure is also highly suggestive of an inner-outer loop design from classical control. Even more importantly is the ease with which this structure allows throttle-based speed control to be integrated with the fuel-based speed controller, described above.

Linear time-invariant compensators $C_1(s)$ and $C_2(S)$ were designed on the basis of classical frequency domain design rules and are represented as:

$$C_1(s) = \frac{(1.2s + 1)}{0.02s + 1} C_o(s)$$

$$C_2(s) = 0.086$$

The $C_1(s)$ compensator is factored into the fuel PID controller, cascaded with a lead term. The DC gain of the lead term has been deliberately set to 1.0 and the overall loop gain adjusted with $C_2(s)$. The purpose of the lead term is to compensate for the phase lag due to the manifold filling dynamics. This representation makes it natural to take the output of the fuel-based speed controller and pass it through the lead term to compute the commanded indicated torque for the throttle-based speed controller. From this, it is clear that there is only one integrator that will have to be protected by anti-windup logic.

The speed-throttle controller is preferably active only when the speed-fuel controller results in saturation of the fuel actuator. This is conveniently achieved in the following manner. Define $$\hat{r}_c(t) = \frac{(1 - F_i(t-d))W_{cyl}(t-d)}{W_f(t-d)},$$

which is the current (estimated) in-cylinder air/fuel ratio. Define $$R(t) := \begin{cases} R_1 & \hat{r}_c(t) \leq R_1 \\ \hat{r}_c(t) & R_1 < \hat{r}_c(t) < R_2 \\ R_2 & \hat{r}_c(t) \geq R_2, \end{cases}$$

and $$W_{cyl}^{T_i} = \frac{T_i^{th}}{a_0 + a_1/R}.$$

Then $$W_{th}^{T_i} = C_2(s)(W_{cyl}^{T_i} - W_{cyl})$$

will be asymptotically zero when the estimated in-cylinder air/fuel ratio is strictly within the allowable bounds given by $R_1$ and $R_2$, and will implement the speed-throttle controller otherwise. As long as the DC-gain of $C_1(s)/C_0(s)$ equals one, then $$\lim_{t \to \infty} (W_{cyl}^{T_i} - W_{cyl})(t) = 0$$

under steady state conditions. By design, $C_1(s)/C_0(s)$ has a DC-gain of unity.

Several more issues should be addressed before the compensators described above are integrated into a functional speed controller. Each issue is a direct or indirect consequence of saturation. For example, the engine can only produce a limited amount of indicated torque, whereas the compensators implicitly assume that indicated torque is bounded neither from above nor from below. When the engine is producing its maximum or minimum torque, anti-windup logic must be placed around the integrator.

The overall speed controller must deal with at least two modes of operation. In the first mode, both fuel and throttle are unsaturated, and consequently, both speed and optimal set-point objectives can be pursued by the controller. In this mode, it is still possible that the planned set-point cannot be achieved due to the manifold pressure reaching its maximum; anti-windup logic is thus necessary around the integrator. In the second mode, fuel is saturated, and only the speed objective can be pursued. The transition between these two modes must be addressed, including when to activate and deactivate the integrator.

Because indicated torque is non-negative, the removal of large load can result in significant speed "flare," followed by speed undershoot, unless a "dashpot" type of action is incorporated into the controller.

Figure 8:
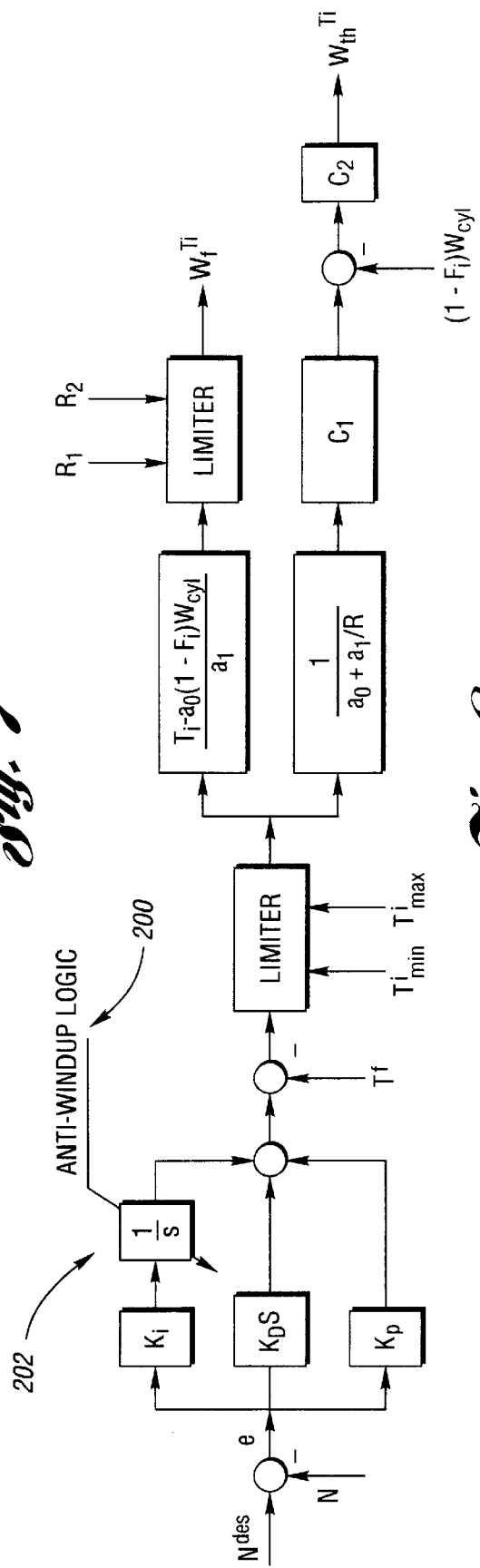
FIG. 8 is a schematic representation of one embodiment of a speed controller according to the present invention.

The modifications to the basic controller are illustrated in FIG. 8. Each element is addressed in turn, beginning with the integrator anti-windup logic indicated generally by numeral 200.

The indicated torque will be at its maximum when the air/fuel ratio is minimum and manifold pressure is maximum; symmetrically, indicated torque will achieve its minimum when the air/fuel ratio is maximum and manifold pressure is minimum. The integrator 202 in the speed controller is thus turned off to prevent windup whenever which decreases the air/fuel ratio, and thus causes the throttle to air/fuel ratio controller to open the throttle, which is in turn helpful for generating more torque, or, the fuel is saturated at a low air/fuel ratio, and the torque controller is opening the throttle itself. When the speed error is negative and small in magnitude, say −50 RPM, there is once again no need to deactivate the throttle to air/fuel ratio controller since fuel adjustments alone can handle this situation.

When the speed error is negative and large in magnitude, then the fuel needs to be shut off and the throttle used for engine braking. In this case, the throttle to air/fuel ratio controller should be deactivated. This may be accomplished with a dashpot mode. A dashpot mode, commonly used in idle speed control of conventional engines, may also be used to handle speed flares from the sudden release of heavy loads and to handle the transition from a high RPM to idle.

To adapt the idle speed controller of this example to a cruise control application, two modifications may be made. First, the engine speed model may be replaced by a vehicle speed model, or engine speed and load may be related to vehicle speed and load through a drivetrain model. Second, the controller may be modified to allow speed errors due to speed set-point command changes to be treated differently than speed errors due to load disturbances.

Figure 9:
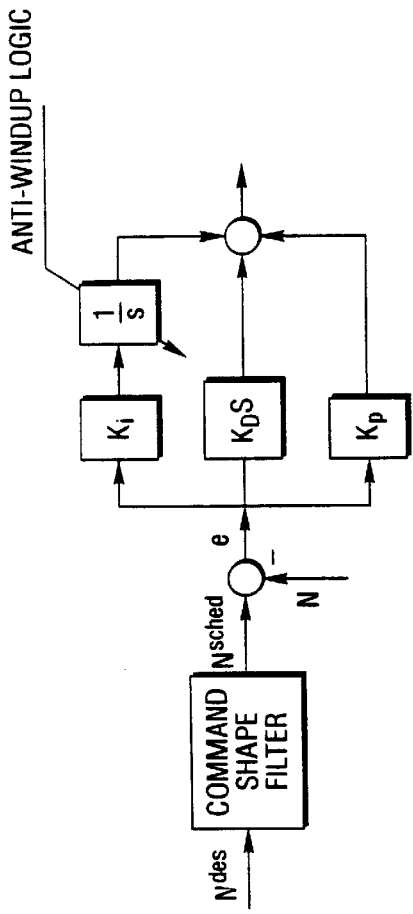
FIG. 9 is a diagram illustrating a two degree of freedom controller design for one embodiment of a speed controller according to the present.

FIG. 9 depicts a modification to the speed controller of FIGS. 7 and 8. This configuration is commonly referred to as a two degree of freedom design since it allows the feedback response to set-point commands to be shaped differently from the response to load disturbances. The command shape filter allows an initially very rapid response to a commanded increase in speed set-point, with a slower $$\begin{cases} r_c \geq R_2 \text{ and } (P_i \leq P_{i\,\min} \text{ or } \theta \leq \theta_{\min}) \text{ and } e < 0 \text{ minimum torque condition} \\ r_c \leq R_1 \text{ and } (P_i \geq P_{i\,\max} \text{ or } \theta \geq \theta_{\max}) \text{ and } e > 0 \text{ maximum torque condition} \end{cases}$$

where e: $=N^{des}-N$. For the model described here, the various parameters were selected as $R_1=14.64$, $R_2=40$, $P_{i\,min}=30$ and $P_{i\,max}=90$. The logic on $\theta$ was not implemented. The integrator 202 is also turned off if the commanded fuel flow rate is less than a minimum value and e<0, which occurs during tip-outs. This can be treated as a special case of the air/fuel ratio becoming too lean.

The commanded indicated torque is limited to values between $T_{i\,min}$ and $T_{i\,max}$. Allowing the commanded indicated torque to take on significantly negative values allows the throttle to be closed rapidly on tip-outs. The value of $T_{i\,max}$ was selected to correspond roughly to the maximum indicated torque limit of the engine under study.

The final modification limits the fuel flow so that estimated in-cylinder air/fuel ratio is within the allowed bounds, $[R_1, R_2]$.

When fuel is not saturated, the throttle is used to achieve the commanded air/fuel ratio set point. However, it is possible that this set-point cannot be achieved. For example, when the load is 45 Nm, even with the manifold pressure at 100 kPa, the air/fuel ratio cannot be made leaner than 29:1. As such, anti-windup logic is also necessary for the integrator in controller (52). Here, the integrator was turned off whenever $$\begin{cases} P_i > 90 \text{ kPa and } r_e^{des}-r_e > 0 \\ P_i < 30 \text{ kPa and } r_e^{des}-r_e < 0 \end{cases}$$

When the speed error $N^{des}-N$ is greater than zero, there is no need to deactivate the throttle to air/fuel ratio controller. This is because, either the torque controller is increasing the fuel, response in the last portion of the speed increase. The rapid portion of the response is for "drivability," while the slower portion is to prevent overshoot. For commanded decreases in speed set-point, the deceleration rate should be limited to a small negative value because the torque that can be generated through engine braking is limited.

These considerations can be realized with the following non-linear shape filter:

$$\dot{N}^{sched} = \max\left\{Decel_{max}, -c_1(N^{sched}-N)-c_2\overline{N}\left(\frac{N^{sched}-N}{\overline{N}}\right)^3\right\}.$$

The cubic term allows an initially fast response with the point at which it becomes dominated by the slower, exponential response of the linear term determined by $\overline{N}$. $c_1$ and $c_2$ are constants that determine the "time constants" of the response while $Decel_{max}$ sets the maximum deceleration rate. A representative value for the constants $c_1$ and $c_2$ is 0.6 with $\overline{N}$=500 RPM, and $Decel_{max}$=−600 RPM/s.

Figure 10:
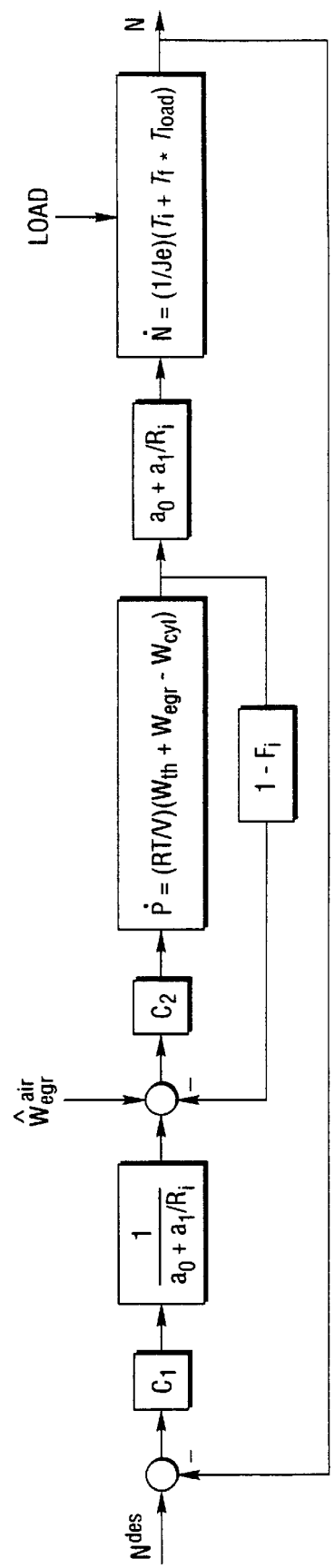
FIG. 10 is a block diagram of an inner-outer loop speed controller architecture with EGR for one embodiment of a speed controller according to the present invention.

FIG. 10 is a block diagram of an inner-outer loop speed controller architecture with EGR for one embodiment of a speed controller according to the present invention. The throttle based speed control described above assumes that all of the required air is delivered by the throttle. However, EGR in a lean burn system consists of burned gas and air. Therefore, some of the air required for torque production is being delivered via the EGR valve. To account for this in the controller structure, an estimate of the amount of air introduced by EGR is subtracted from the air demand as illustrated in FIG. 10. This estimate may be determined by any of a number of methods known by those of ordinary skill in the art.

As such, the present invention provides systems and methods for speed control in a direct injected spark ignition engine which improve the compromises between maintaining a desired speed and engine set-points for best performance while operating in stratified charge mode. The invention uses fuel as the primary fast torque actuator with airflow as the secondary actuator so that spark can be kept at or near MBT. The control strategies are functional over the entire engine operating range and may be used for idle speed control as well as vehicle speed control when operating in a cruise control mode.

While the best mode for carrying out the invention has been described in detail, those familiar with the art to which this invention relates will recognize various alternative designs and embodiments for practicing the invention as defined by the following claims.

What is claimed is:

1. A method for controlling speed in a direct injection spark ignition internal combustion engine application, the method comprising:
   determining a speed error based on a difference between an actual speed and a scheduled speed;
   determining a desired engine torque based on the speed error;
   determining required fuel to deliver the desired engine torque;
   calculating an air/fuel ratio based on the required fuel and current airflow; and
   using fuel alone to achieve the desired engine torque if the air/fuel ratio is within an acceptable air/fuel ratio range for current engine operating conditions by controlling at least one fuel injector to deliver the required fuel.

2. The method of claim 1 wherein the step of determining a speed error comprises determining a difference between an actual engine speed and a scheduled engine speed.

3. The method of claim 2 wherein determining a scheduled engine speed comprises determining an engine idle speed.

4. The method of claim 2 wherein determining a scheduled engine speed comprises determining a scheduled engine speed based on a desired vehicle speed.

5. The method of claim 1 wherein the step of determining a speed error comprises determining a difference between an actual vehicle speed and a scheduled vehicle speed.

6. The method of claim 1 wherein the step of determining a speed error comprises determining a scheduled speed by:
   applying a nonlinear element to a difference between a desired speed and a previously computed scheduled speed, the nonlinear function decreasing as the scheduled speed approaches the desired speed;
   applying a linear term to the difference; and
   combining results from applying the nonlinear function and the linear term and integrating to determine a new value for the scheduled speed.

7. The method of claim 1 wherein the step of determining a desired engine torque comprises:
   determining a commanded engine brake torque using a controller which reduces the speed error; and
   adjusting the commanded engine brake torque for friction losses to determine a commanded indicated torque.

8. The method of claim 7 wherein the step of determining a desired engine torque comprises determining an engine brake torque using a phase lag controller.

9. The method of claim 7 wherein the step of determining a desired engine torque comprises determining an engine brake torque using a proportional-integral controller.

10. The method of claim 1 further comprising limiting the desired engine torque to a predetermined engine torque range.

11. The method of claim 1 further comprising:
    controlling intake airflow and EGR to adjust air/fuel ratio and burned gas mass fractions to optimized set-point values.

12. The method of claim 11 wherein controlling intake airflow includes adjusting throttle angle of an electronically controlled throttle valve and/or controlling an idle bypass valve.

13. The method of claim 1 wherein the air/fuel ratio is outside an acceptable air/fuel ratio range for current engine operating conditions, the method further comprising:
    controlling airflow to achieve the desired engine torque and reduce the speed error.

14. The method of claim 13 wherein the step of controlling airflow comprises:
    calculating a fuel limit based on an upper or lower bound of the acceptable air/fuel ratio range corresponding to current engine operating conditions;
    modifying the desired engine torque to compensate for intake manifold filling effects;
    determining the airflow required to achieve the modified desired engine torque using the fuel limit; and
    controlling at least one airflow actuator to provide the required airflow.

15. The method of claim 14 wherein the step of controlling at least one airflow actuator comprises controlling an EGR valve.

16. The method of claim 14 wherein the step of controlling at least one airflow actuator comprises controlling an electronically controlled throttle valve.

17. The method of claim 14 wherein the step of controlling at least one airflow actuator comprises controlling engine intake or exhaust valve timing.

18. A computer readable storage medium having stored data representing instructions executable by a computer to control a direct injection internal combustion engine to control vehicle or engine speed, the computer readable storage medium comprising:
    instructions for determining a speed error based on a difference between an actual speed and a scheduled speed;
    instructions for determining a desired engine torque based on the speed error;
    instructions for determining required fuel to deliver the desired engine torque;
    instructions for calculating an air/fuel ratio based on the required fuel and current airflow;
    instructions for using fuel alone to achieve the desired engine torque if the air/fuel ratio is within an acceptable air/fuel ratio range for current engine operating conditions by controlling at least one fuel injector to deliver the required fuel;
    instructions for calculating a fuel limit based on an upper or lower bound of the acceptable air/fuel ratio range corresponding to current engine operating conditions;
    instructions for modifying the desired engine torque to compensate for intake manifold filling effects;
    instructions for determining the airflow required to achieve the modified desired engine torque using the fuel limit; and
    instructions for controlling at least one airflow actuator to achieve the modified desired engine torque if the air/fuel ratio based on the desired engine torque is outside the acceptable air/fuel ratio range for current engine operating conditions.

19. The computer readable storage medium of claim 18 wherein the instructions for determining a speed error include instructions for determining a speed error based on a difference between an actual engine speed and a scheduled engine speed.

20. The computer readable storage medium of claim 18 wherein the instructions for determining a speed error include instructions for determining a speed error based on a difference between an actual vehicle speed and a scheduled vehicle speed.

21. A system for controlling speed in a direct injection spark ignition internal combustion engine application, the system comprising:

a speed sensor for providing an indication of actual speed;

at least one fuel actuator for providing a quantity of fuel to one or more cylinders of the internal combustion engine in response to a fueling signal;

at least one airflow actuator for modulating airflow into one or more cylinders of the internal combustion engine in response to a corresponding control signal; and a controller in communication with the speed sensor, the at least one fuel actuator, and the at least one airflow actuator, the controller determining a speed error based on a difference between the actual speed and a scheduled speed, determining a desired engine torque based on the speed error, determining required fuel to deliver the desired engine torque, calculating an air/fuel ratio based on the required fuel and current airflow corresponding to current position of the at least one airflow actuator, and using fuel alone to achieve the desired engine torque if the air/fuel ratio is within an acceptable air/fuel ratio range for current engine operating conditions by controlling the at least one fuel actuator to deliver the required fuel to one or more cylinders, and using airflow to achieve the desired engine torque when the air/fuel ratio is outside the acceptable air/fuel ratio range for current engine operating conditions.

\* \* \* \* \*